(12) United States Patent
Morishita et al.

(10) Patent No.: US 8,248,828 B2
(45) Date of Patent: Aug. 21, 2012

(54) MEDIUM VOLTAGE INVERTER SYSTEM (75) Inventors: Takashi Morishita, Houston, TX (US);
Mike Daskalos, Magnolia, TX (US);
Toshiaki Oka, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 443 days.

(21) Appl. No.: 12/416,631

(22) Filed: Apr. 1, 2009

(65) Prior Publication Data

US 2010/0254171 A1 Oct. 7, 2010

(51) Int. Cl.
*H02M 7/48* (2007.01)
*H02M 7/521* (2006.01)
(52) U.S. Cl. .......................... 363/71; 363/137
(58) Field of Classification Search .............. 363/34, 363/36, 37, 55, 56.01, 56.03, 137, 71, 132
See application file for complete search history.

(56) References Cited

U.S. PATENT DOCUMENTS

| 5,625,545 | A | 4/1997 | Hammond et al. |
| 5,805,437 | A | 9/1998 | Gruning |
| 6,377,478 | B1* | 4/2002 | Morishita ............... 363/71 |
| 2007/0195567 | A1* | 8/2007 | Morishita ............... 363/55 |

FOREIGN PATENT DOCUMENTS

EP 0802617 A2 10/1997

* cited by examiner

*Primary Examiner* — Jue Zhang
(74) *Attorney, Agent, or Firm* — Banner & Witcoff, Ltd.

(57) ABSTRACT

An inverter system for driving electrical loads such as multi-phase induction motors is disclosed utilizing five single-phase inverter cells configured in a wye configuration. Inverter cells such as neutral-point-clamp inverter cells are configured to generate a voltage waveform between two output terminals and further configured with a terminal providing a neutral voltage reference point with respect to each of the two output terminals. The inverter cells may be configured with the neutral voltage reference points connected together and with one output terminal from each inverter cells connected together to provide three outputs of the inverter system at different voltage phases and with the common neutral reference point as the wye connection of the three outputs. The other three single phase inverter cells may be added to each of the three outputs to boost the output voltage of the inverter system and decrease the maximum voltage requirements on each inverter cell.

21 Claims, 12 Drawing Sheets

MEDIUM VOLTAGE INVERTER SYSTEM

FIELD OF THE SPECIFICATION

The present application relates generally to an inverter device, and more particularly an apparatus for driving electrical loads such as induction motors.

BACKGROUND

Figure 1A:
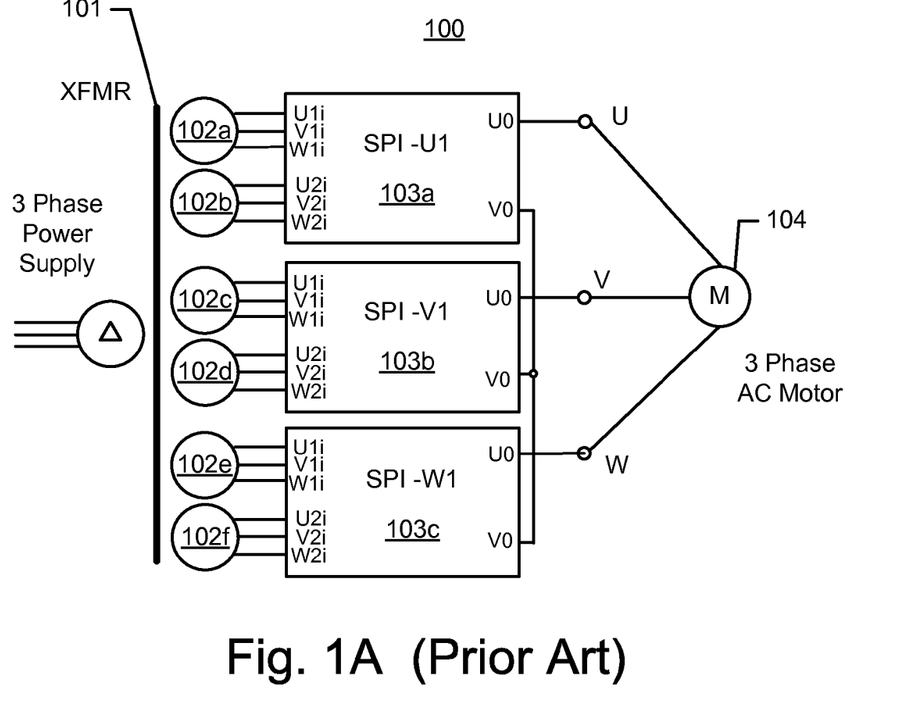
FIG. 1A illustrates a known three phase inverter system having three inverter cells configured in a wye connection.

Inverter systems such as the one illustrated in FIG. 1A are known for driving AC motors, particularly as applied to controlling medium and high voltage AC motors. Such systems employ multiple inverter cells to convert multi-phase AC power to DC power, and then, to "invert" the DC power back to multiple waveforms of AC power. The inverter cell outputs are controlled using pulse-width-modulation techniques to determine the phase and amplitude of the waveforms in a prescribed manner.

Inverter system 100 in FIG. 1A, for example, employs three single-phase inverter cells, 103a, 103b, and 103c, configured to produce three voltage waveforms at nodes U, V, and W for driving the three-phase motor 104. Each cell outputs a waveform across the U0 to V0 terminals, with the V0 terminals connected together at a wye connection, and with each of the U0 terminals connected to one of the three phase output terminals U, V, and W, respectively (the choice of "U" "V" and "W" herein for the three-phase output, and the "U" and "V" inverter cell output terminals, is for convenience of notation). The wye connection creates a common reference point for all three outputs U, V, and W, and the inverter system is configured to generate the waveforms at 120° phase offsets from one another. At the inputs of the inverter system, inverter cells 103a, 103b, and 103c each have two 3-phase inputs 102a&b, 102c&d, and 102e&f, respectively, coupled through transformer 101 to a three-phase power source.

Figure 1B:
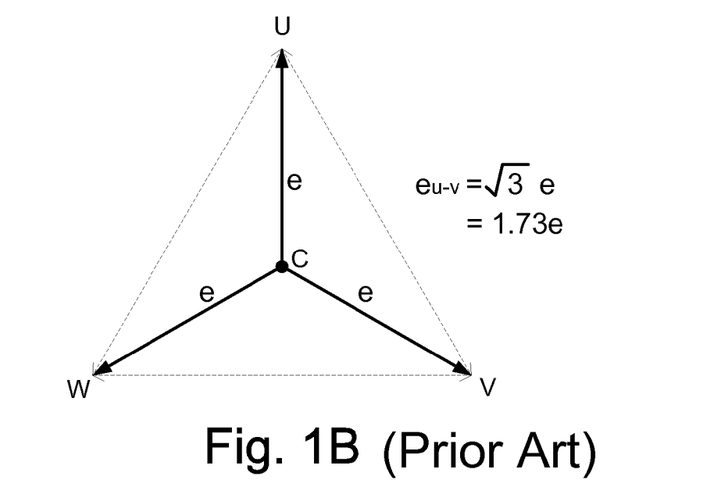
FIG. 1B illustrates a vector representation of the inverter system of FIG. 1A.

FIG. 1B is a vector representation of the output of the inverter system shown in FIG. 1A. Each vector of the figure represents the output waveforms between the common wye connection X and each of the inverter system output terminals U, V, W. The vectors point in 120° phase difference from one another, and each vector has a magnitude of "e." When the outputs have phase offsets of 120°, the terminal-to-terminal outputs, $e_{u-v}$, $e_{v-w}$, and $e_{w-u}$, each have a magnitude of:

$$e_{u-v} = e\sqrt{3} = 1.73e$$

Figure 1C:
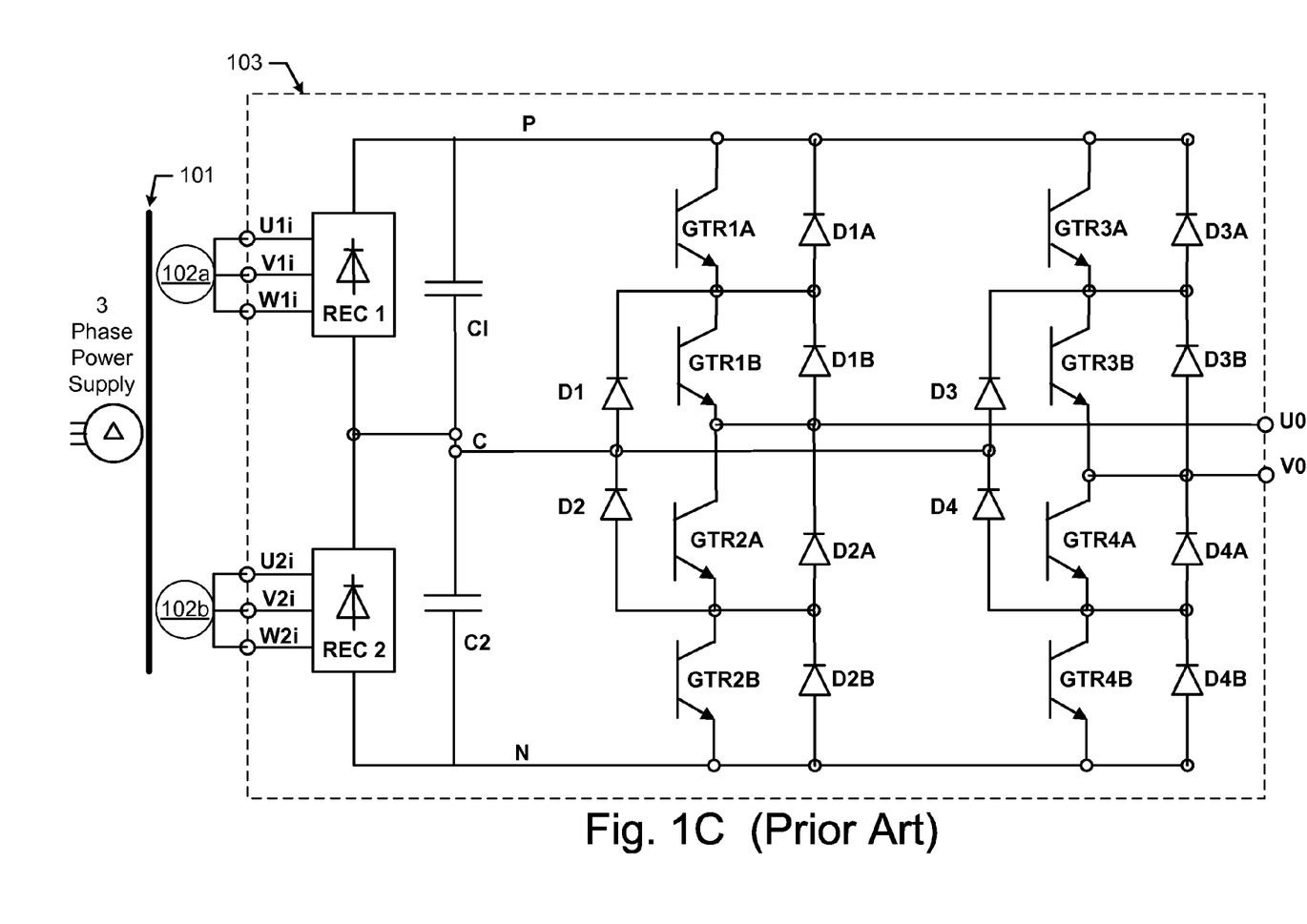
FIG. 1C illustrates a circuit diagram of a typical neutral-point-clamp inverter cell that may be used in inverter system designs.

Inverter systems for medium and high voltage applications often make use of single-phase neutral-point-clamp (NPC) type inverter cells. FIG. 1C illustrates a typical NPC inverter cell circuit 103 used in the inverter system 100. Inputs 102a and 102b couple input power through transformer 101 to rectifier bridges REC1 and REC2 which convert the received AC power into DC power across smoothing capacitors C1 and C2 respectively. GTR1A&B, GTR2A&B, GTR3A&B, and GTR4A&B are switch pairs, of any type of switching device, controlled with a pulse-width-modulation (PWM) control system (not shown) to invert the DC power to AC power across output terminals U0 and V0. Diodes D1, D2, D3, and D4 are clamp diodes connected between the center of each switch pair and the "neutral" point C of the inverter cell.

Figure 2A:
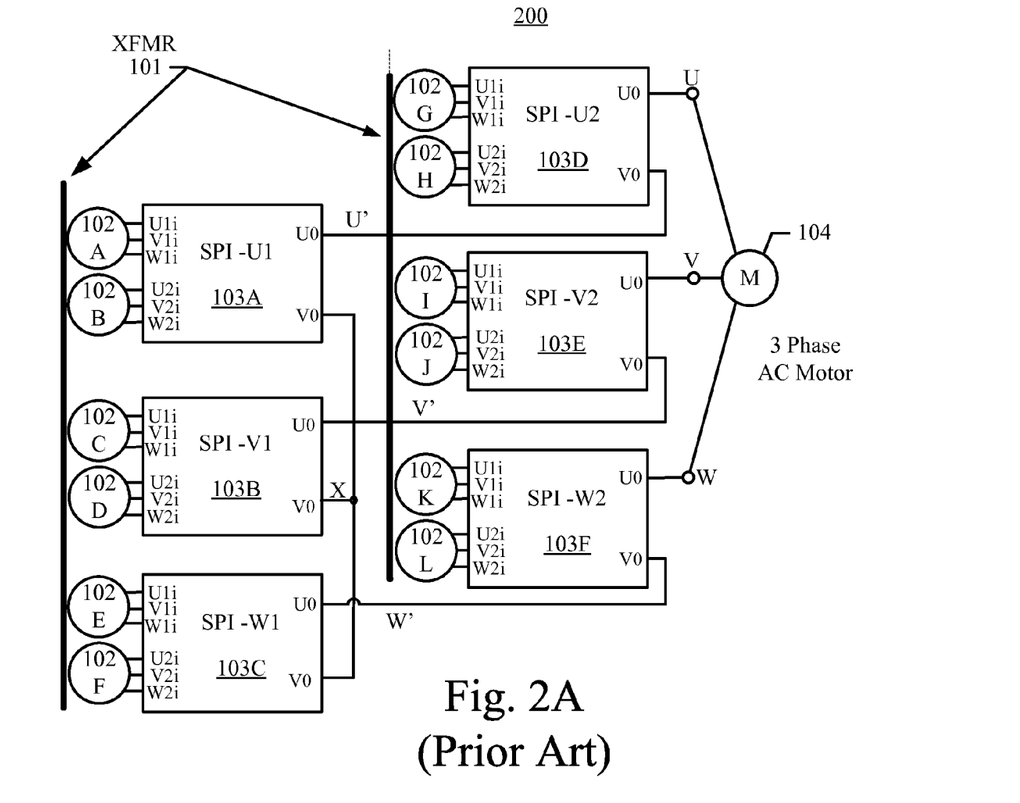
FIG. 2A illustrates a known multi-cell inverter system for obtaining higher output voltages than can be achieved by the inverter system illustrated in FIG. 1.
Figure 2B:
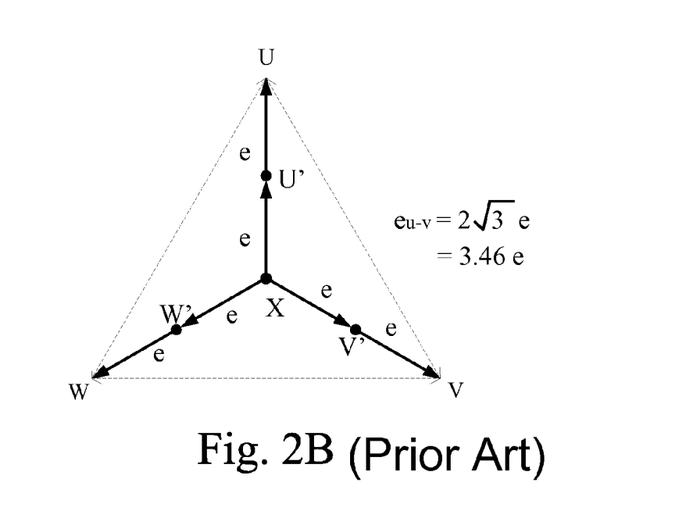
FIG. 2B illustrates a vector representation of the inverter system of FIG. 2A.

FIG. 2A illustrates another known multi-cell inverter system for obtaining higher output voltages than can be achieved by the inverter system illustrated in FIG. 1. The inverter system in FIG. 2A utilizes six inverter cells. Inverter cells 103a, 103b, and 103c of FIG. 2 are identical to the inverter cells in FIG. 1. Additional inverter cells 103d, 103e, and 103f have outputs connected in series with the outputs of 103a, 103b, and 103c respectively to boost the voltage on the three outputs U, V, and W of the system. As shown in the vector diagram in FIG. 2B, the additional cells produce outputs of the same magnitude and phase as the cells to which they are serially connected causing the serial combination of cells to produce twice the voltage of a single inverter cell at each phase output of the inverter system. The terminal-to-terminal output voltages, $e_{u-v}$, $e_{v-w}$, and $e_{w-u}$ are equivalent, and are as follows:

$$e_{u-v} = 2e\sqrt{3} = 3.46e$$

(e being the output voltage of a single cell)

The inverter system of FIG. 2A can support higher voltage levels, but it uses twice as many inverter cells as the FIG. 1 system. If the FIG. 2A configuration were used to support the same voltage levels as the FIG. 1 system, then the FIG. 2A system could be implemented with lower-rated (and lower cost) inverter cells, but the additional cells still increase the risk of failure because there are more devices that could fail.

Figure 2C:
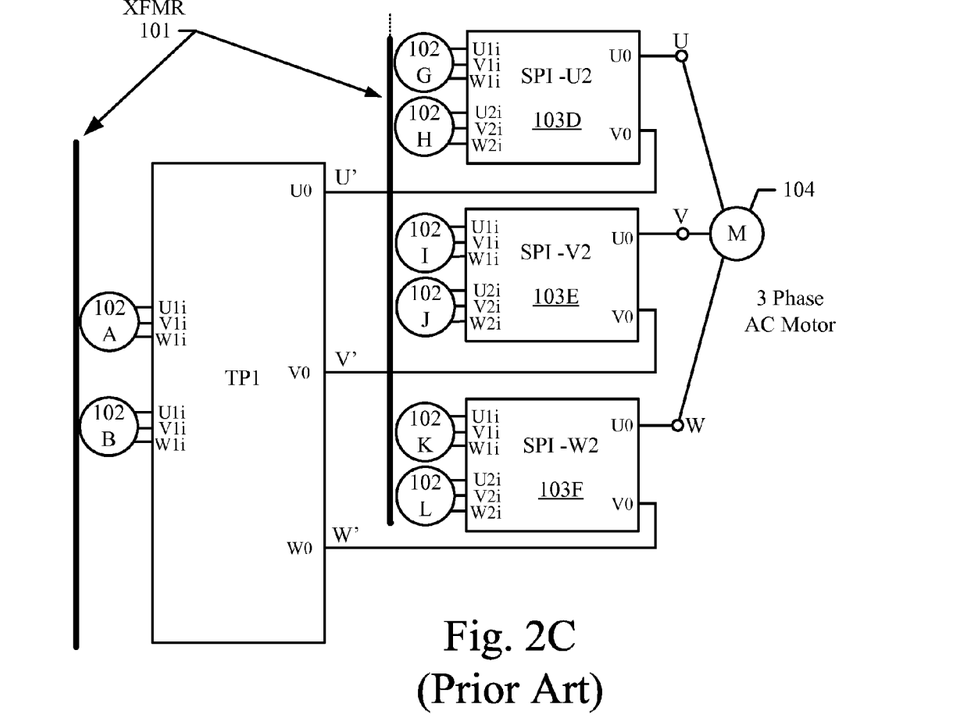
FIGS. 2C and 2D illustrate another known system and corresponding vector representation.
Figure 2D:
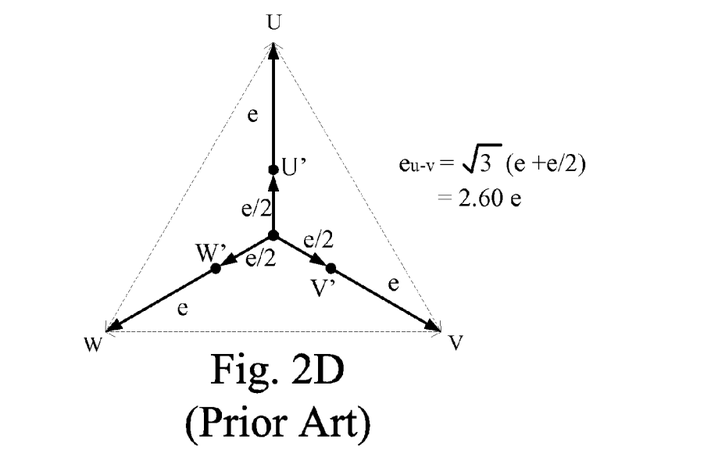

FIG. 2C illustrates another configuration, in which three of the single-phase cells from the FIG. 2A configuration are replaced with a single three-phase inverter cell TP1, and used with three NPC single-phase cells. FIG. 2D illustrates the vector configuration for FIG. 2C, and as illustrated, the FIG. 2C configuration can also be used to support higher voltage levels than the FIG. 1 configuration, but the FIG. 2C configuration requires two different types of inverter cells (three-phase and single-phase). Accordingly, there remains a need to support higher voltage levels, while also minimizing the risk of failure (and cost).

SUMMARY

In consideration of the aforementioned advantages and disadvantages, the present application provides in various embodiments, an inverter system which: provides a higher output voltage than the inverter system of FIG. 1, and yet requires fewer inverter cells than the inverter system of FIG. 2.

According to one aspect, an inverter system for driving multiphase induction motors is disclosed utilizing two single-phase inverter cells configured in a wye configuration. Each inverter cell is configured to generate a voltage waveform between two output terminals and further configured with a terminal providing a neutral voltage reference point with respect to each of the two output terminals. The neutral points of the two inverter cells are connected together and one output of each of the inverter cells are also connected together. The two inverter cells together provide three outputs waveforms at different phases and utilize the common neutral reference point as the wye connection of the three waveform outputs.

According to another aspect, an additional single-phase inverter cell is connected serially to each of the three outputs of the two-cell configuration to boost the output voltage of each of the three outputs and to reduce the voltage rating required for each of the five inverter cells.

According to yet another aspect, the inputs of each of the inverter cells in either the two cell or five cell configuration are coupled to an AC power source through a transformer such that each input is coupled at a different phase to reduce total harmonic distortion at the input.

In some aspects, the system may include five inverter cells, each including a U-output terminal and a V-output terminal, wherein the U-output terminal of the first inverter cell is electrically coupled to the V-output terminal of the second inverter cell, the V-output terminal of the first inverter cell is electrically coupled to the U-output terminal of the third inverter cell, and to the V-output terminal of the fourth inverter cell, the V-output terminal of the third inverter cell is electrically coupled to the V-output terminal of the fifth inverter cell, and the U-output terminals of the second, fourth and fifth inverter cells are configured to collectively provide a three-phase output of the system.

In some aspects, the first and third inverter cells include DC bus neutral points that are electrically coupled to one another. Other points on the DC bus, such as positive and negative terminals, may also be connected.

In some aspects, the system may receive its three-phase inputs from a single transformer. Alternatively, multiple transformers may be used to supply the inverters with inputs. In some embodiments, each inverter may receive inputs from two transformers, at separate phases.

In some aspects, the inverter cells may be electrically identical, and may be single-phase neutral-point-clamp type inverter cells.

BRIEF DESCRIPTION

A more complete understanding of the features described herein and the advantages thereof may be acquired by referring to the following description in consideration of the accompanying drawings, in which like reference numbers indicate like features, and wherein.

DETAILED DESCRIPTION

In the following description, reference is made to the accompanying drawings, which form a part hereof, and in which is shown by way of illustration various features that may be used. It is to be understood that other embodiments may be utilized and structural and functional modifications may be made without departing from the scope and spirit of the present application.

Figure 3A:
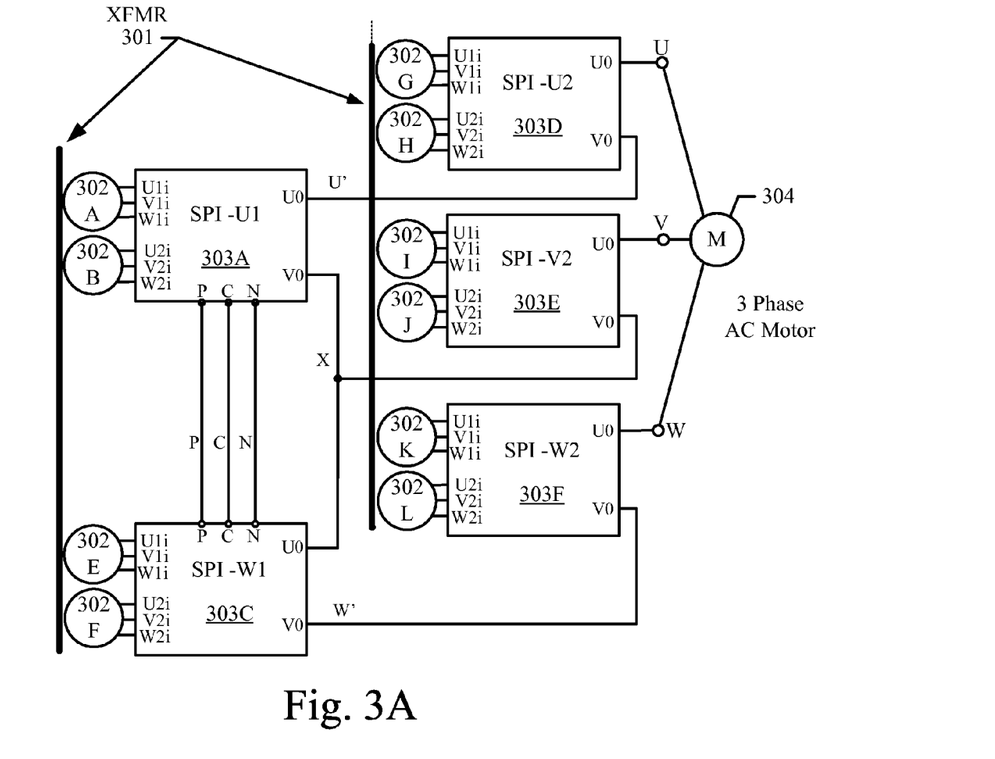
FIG. 3A illustrates a circuit diagram of one embodiment of an inverter system utilizing five single-phase neutral-point-clamp inverter cells.

FIG. 3A illustrates, in one exemplary aspect, an inverter system 300 for controlling medium and high voltage three-phase loads such as inductive motors. As in the inverter systems of FIGS. 1A and 2A, inverter system 300 drives three waveform outputs, U, V, and W, referenced to a wye connection. As described herein, "wye configuration" and "wye connection" refer to a configuration where the three waveform outputs share a common "neutral" reference and where each waveform is at a 120° phase offset from the other waveforms. Additionally, as various aspects are not strictly limited to three phases or to specific phase offsets, reference to "wye configuration" and "wye connection" in describing a particular embodiment indicates that the novel features of the particular embodiment may be extended to similar type configurations comprising any multiple of waveform outputs sharing a common "neutral" reference and phased at any pre-designed offsets. And finally, the description below refers to components being connected to one another. That connection may be an electrical coupling that may be a direct coupling with no intervening components. Alternatively, that coupling may be an indirect coupling with intervening components (e.g., a fuse or other desired components) that do not unduly interfere with the described functionality.

The inverter system 300 comprises five single-phase inverter cell elements 303a, 303b, 303d, 303e, and 303f. In one aspect, all of the inverter cells in inverter system 300 may share the same design, and using the system herein may include replacing a failed one of the inverter cells with a duplicate cell. Having identical designs may reduce inventory costs, by allowing system operators to stock just the one type of inverter cell. In another aspect, the inverter cells may have different designs, which may assist in any desired customization, with the tradeoff in requiring system operators to stock different types of backup inverter cells.

In this exemplary aspect, the inverter cells 303a, 303b, 303d, 303e, and 303f have two 3-phase inputs 302a&b, 302e&f, 302g&h 302i&j, and 302k&l respectively, coupled through transformer 301 to an AC power source (not shown). The AC power source may be a single-phase or a multi-phase source. The inverter cells transform the coupled AC input power to a voltage waveform across output terminals U0 and V0. In addition, inverter cells 303a and 303c each contain a "neutral" voltage reference terminal, C, relative to voltage outputs U0 and V0. The C terminal of 303a and 303c are connected together to form the "neutral" point of the wye configuration of the entire inverter system 300. With 303a and 303c configured with a shared "neutral" point C, the U0 output terminal of 303a may be configured to drive a U'-to-C voltage output on node U' at a first phase and the V0 output terminal of 303c may be configured to drive a W'-to-C voltage output on node W' at a second phase. The V0 output of 103a and the U0 output of 103c are connected together and may be configured in parallel to drive a X-to-C voltage output on to node X at a third phase.

Exemplary inverter cells 303a and 303c may be neutral-point-clamp type inverter cells where C is the "common" terminal of the internal DC voltage bus of the inverter cell. Also in this example, the "positive" terminals, P, and "negative" terminals, N, of the internal DC voltage buses of 303a and 303c may also be connected together. The internal circuit of the neutral-point-clamp inverter cell is further described below with respect to FIG. 3C.

In one aspect, 303d, 303e, and 303f, as illustrated, may be connected in series with U', V', and W', respectively to boost the output voltages at nodes U, V, and W respectively for driving the electrical load 304. In inverter system 300, 303d is connected in series with the U0 terminal of 303a and configured to drive a U-to-U' voltage at the 303d outputs in the same phase as the U'-to-C voltage to generate a total sum U-to-C output voltage of the inverter system at a first phase. Similarly, 303f is connected in series with the V0 terminal of 303c and configured to drive a W-to-W' voltage at the 303f outputs in the same phase as the W'-to-C voltage to generate a total sum W-to-C output voltage of the inverter system at a second phase. Finally, 303e is connected in series with the parallel combination of the V0 terminal of 303a and the U0 terminal of 303c and configured to drive a V-to-X voltage at the 303f outputs in the same phase as the X-to-C voltage to generate a total sum V-to-C output voltage of the inverter system at a third phase. The first, second, and third phases may be determined using a pulse-width-modulation controller as is described below with respect to FIGS. 5A-5D.

Figure 3B:
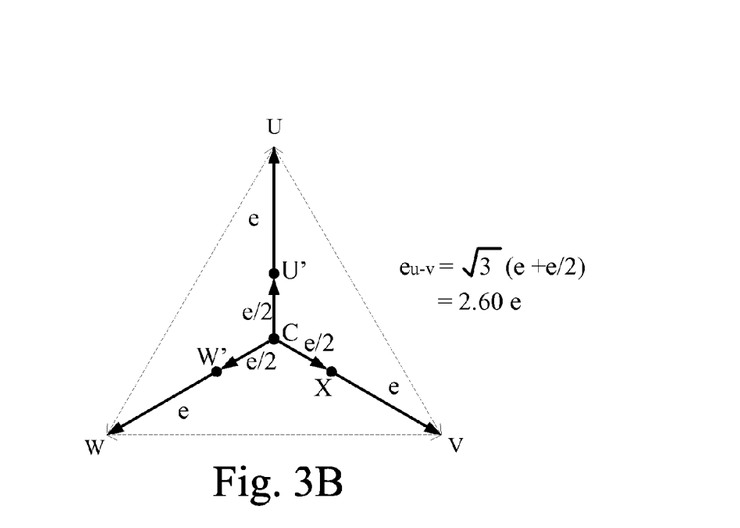
FIG. 3B illustrates a vector representation of the inverter system of FIG. 3A.

FIG. 3B illustrates a vector representation of the voltage outputs of the inverter system 300 using five cells. The representation resembles that of FIG. 2D, although the physical configuration is different. Each vector of the figure represents the output waveforms of each inverter cell. Vectors U-to-U', W-to-W', and V-to-X represent the outputs of 303d, 303e, and 303f respectively and have a magnitude of "e." Vectors U'-to-C, W'-to-C, and X-to-C represent the outputs of 303a and 303c and have a magnitude of "e/2." In this example, the reduced voltage outputs of the 303a and 303c inverter cells result from the C neutral point being referenced approximately half way between the full U0-to-V0 output voltage. When the outputs are in such a configuration, the full terminal-to-terminal outputs, $e_{u \text{-} v}$, $e_{v \text{-} w}$, and $e_{w \text{-} u}$, each have a magnitude as follows:

$$e_{u \text{-} v} = \sqrt{3}(e + e/2) = 2.60e$$

Inverter system 300 with either two inverter cells in one aspect, or five inverter cells in another aspect, is easily contrasted with the inverter systems of FIG. 1 and FIG. 2 requiring 3 inverter cells and six inverter cells respectively, and where the "neutral" point is created by connecting the V0 terminals of 103a, 103b, and 103c at node X. Further, the advantages of the exemplary five cell inverter 300 over the three cell inverter 100 may be seen in the application of driving a 6.5 kV motor. In such an application the inverter system 300 would require single phase inverter cells at a standard rating of 2.5 kV (1.73*[2.5 k+1.25 k]=6.5 kV). Comparatively, the inverter system 100 of FIG. 1 would require inverter cells at a less readily-available rating of 3.8 kV (1.73*3.8 k=6.6 kV).

Figure 3C:
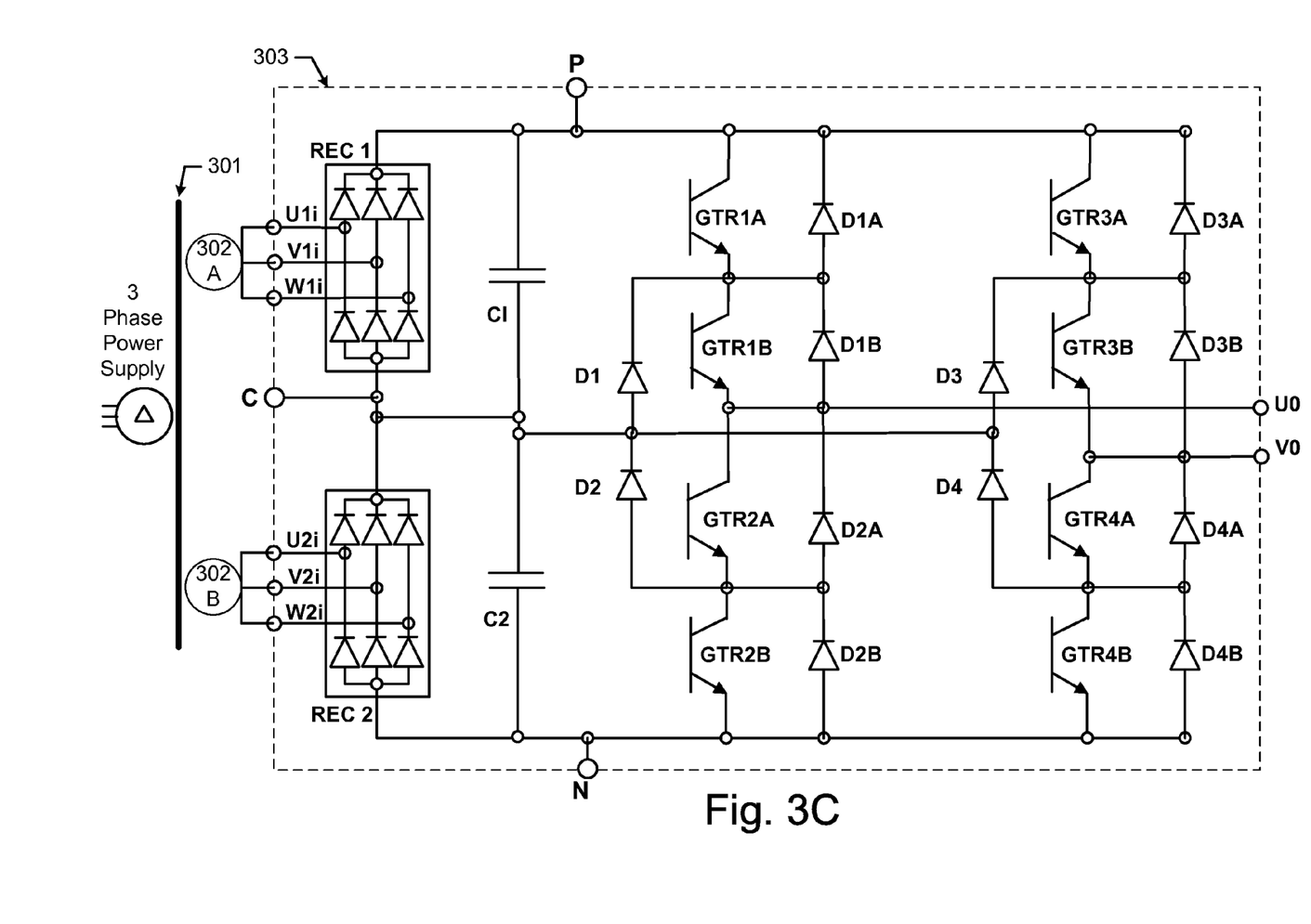
FIG. 3C illustrates a circuit diagram of one embodiment of a single-phase neutral-point-clamp inverter cell that may be used in the inverter system of FIG. 3A.

FIG. 3C illustrates a circuit diagram of a single-phase neutral-point-clamp inverter cell that may be used in one aspect of the inverter system 300 of FIG. 3A. Inverter cell 303 includes 3-phase bridge rectifiers, REC1 and REC2, comprising six rectifying diodes each, for converting three phase AC power at the two inputs 302a and 302b, into DC power across the DC power bus (P, C and N terminals). Inputs 302a and 302b are coupled from the three-phase power source through transformer 301. In an alternate aspect, REC1 and REC 2 may rectify single-phase input power or other multi-phase input power. These rectifiers may be integral to the cell, or they may be external to the cell. The DC power bus comprises positive terminal, P, negative terminal, N, common terminal, C, and smoothing capacitors C1 and C2. GTR1A&B, GTR2A&B, GTR3A&B, and GTR4A&B are transistor switch pairs controlled through their switch gates with a pulse-width-modulation (PWM) control system (not shown) to invert the DC power to AC power waveforms across output terminals U0 and V0. The GTR transistors may be insulated gate bipolar transistors (IGBTs) or other suitable devices for switching high voltage power. Diodes D1, D2, D3, and D4 are clamp diodes connected between the center of each switch pair and the "neutral" point C of the inverter to prevent the voltage across any switch from exceeding one bus level. Diodes D1A, D1B, D2A, D2B, D3A, D3B, D4A and D4B are free wheeling diodes to allow continuous current to the load and prevent reverse voltage damage to the GTR switches.

For inverter cells 303a and 303c of inverter system 300, the P, N, and C, terminals of the DC power bus in 303 are brought external to the cell so that they may be connected with the corresponding P, N, and C terminals of the other inverter cell. In various aspects, 303d, 303e, and 303f may be identical in circuit design to 303a and 303c, and may have similar or identical packages to 303a and 303c, so that all inverter cells may be interchangeable and so that the inverter system may be easily maintained and serviced by requiring only one type of inverter cell replacement component for the entire system.

Figure 4A:
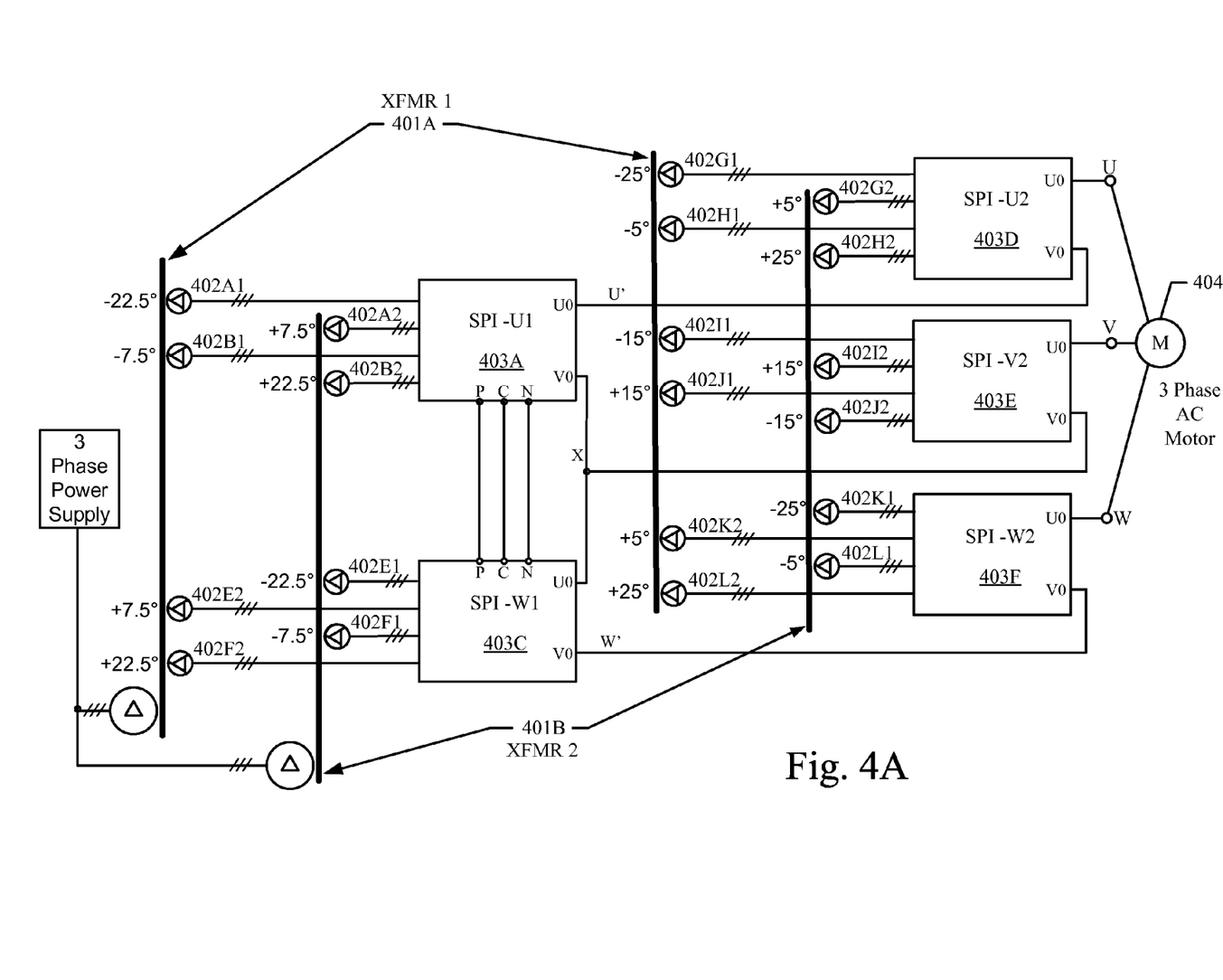
FIG. 4A illustrates a circuit diagram of an alternate embodiment of an inverter system utilizing five single-phase neutral-point-clamp inverter cells.

In another aspect, FIG. 4A illustrates an inverter system with similar topology to the example in FIG. 3A, except that two transformers are used to supply modified inverter cells, 403a, 403c, 403d, 403e, and 403f that have four AC inputs each. In this aspect, having two input transformers helps reduce the size of each input transformer. Two inputs of each inverter cell are coupled to a first transformer 401a, and the other two inputs of each inverter are coupled to a second transformer, 401b. Further, to reduce overall total harmonic distortion on the input power line, the inputs of the inverter cells may be phase shifted from one another. In this exemplary aspect, transformers 401a and 401b may be identical with each comprising a primary winding, and ten secondary windings. This allows the end user to inventory one smaller size transformer as a common spare. Four of the secondary windings on each transformer may have −22.5°, −7.5°, 22.5°, and 7.5° respective phase angles and may be connected to the inputs of 403a and 403c. The remaining six secondary windings on each transformer may have −25°, −15°, −7.5°, 25°, 15°, and 7.5° respective phase angles and may be connected to the inputs of 403d, 403e, and 403f. The phase angles at the inputs of the inverter cells may also be different values that are tailored for a specific noise environment.

Figure 4B:
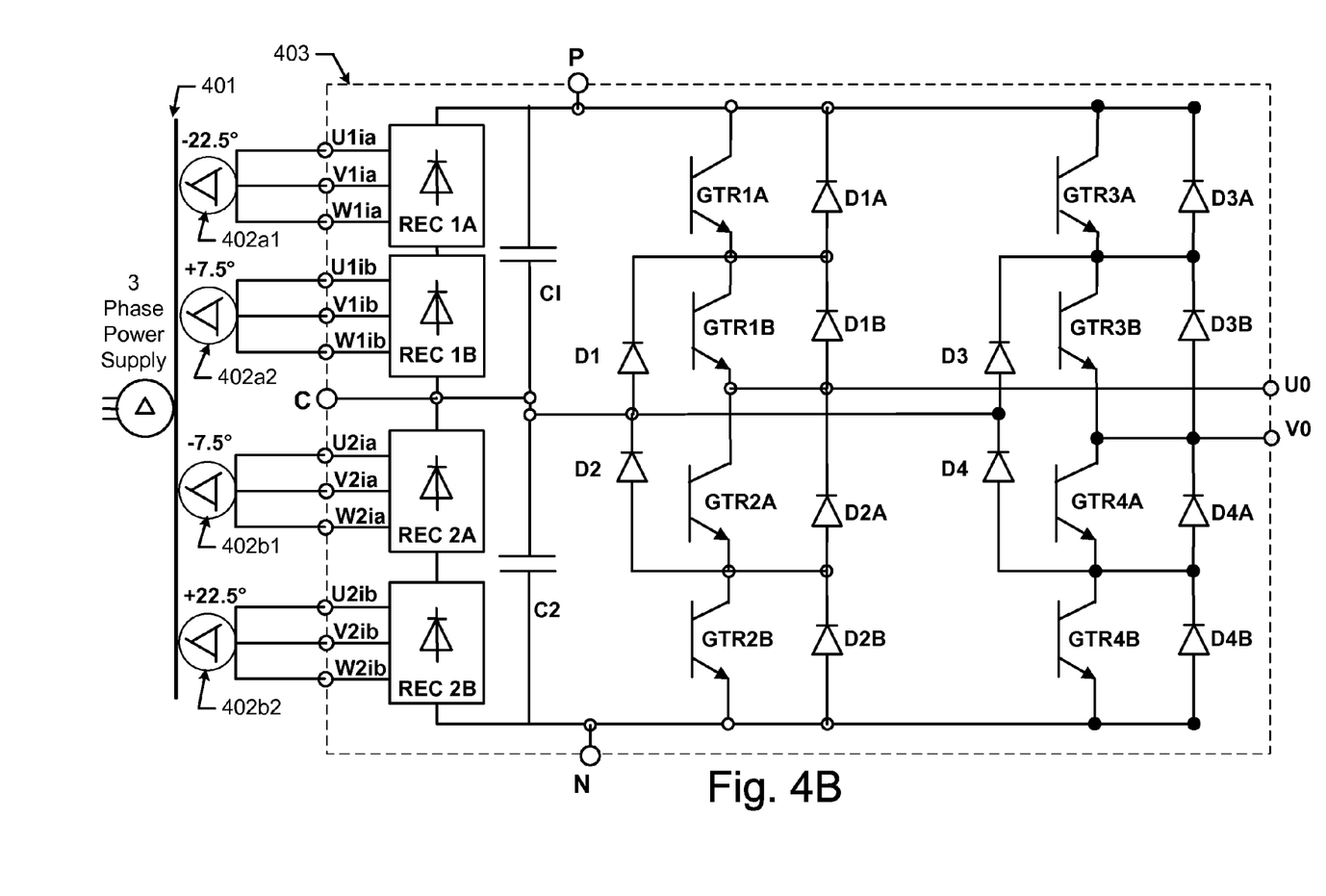
FIG. 4B illustrates a circuit diagram of one embodiment of a single-phase neutral-point-clamp inverter cell that may be used in the inverter system of FIG. 4A.

FIG. 4B illustrates a circuit diagram of one embodiment of a single-phase neutral-point-clamp inverter cell 403 that may be used in the inverter system of FIG. 4A. The circuit is similar to that of FIG. 3C, except that at the input of the inverter cell, inputs 302a, 302b and rectifier bridges REC1 and REC2 of inverter cell 303 are replaced with 402a1, 402a2, 402b1, and 402b2 inputs and rectifier bridges REC1A, REC1B, REC2A, and REC2B respectively.

Figure 5A:
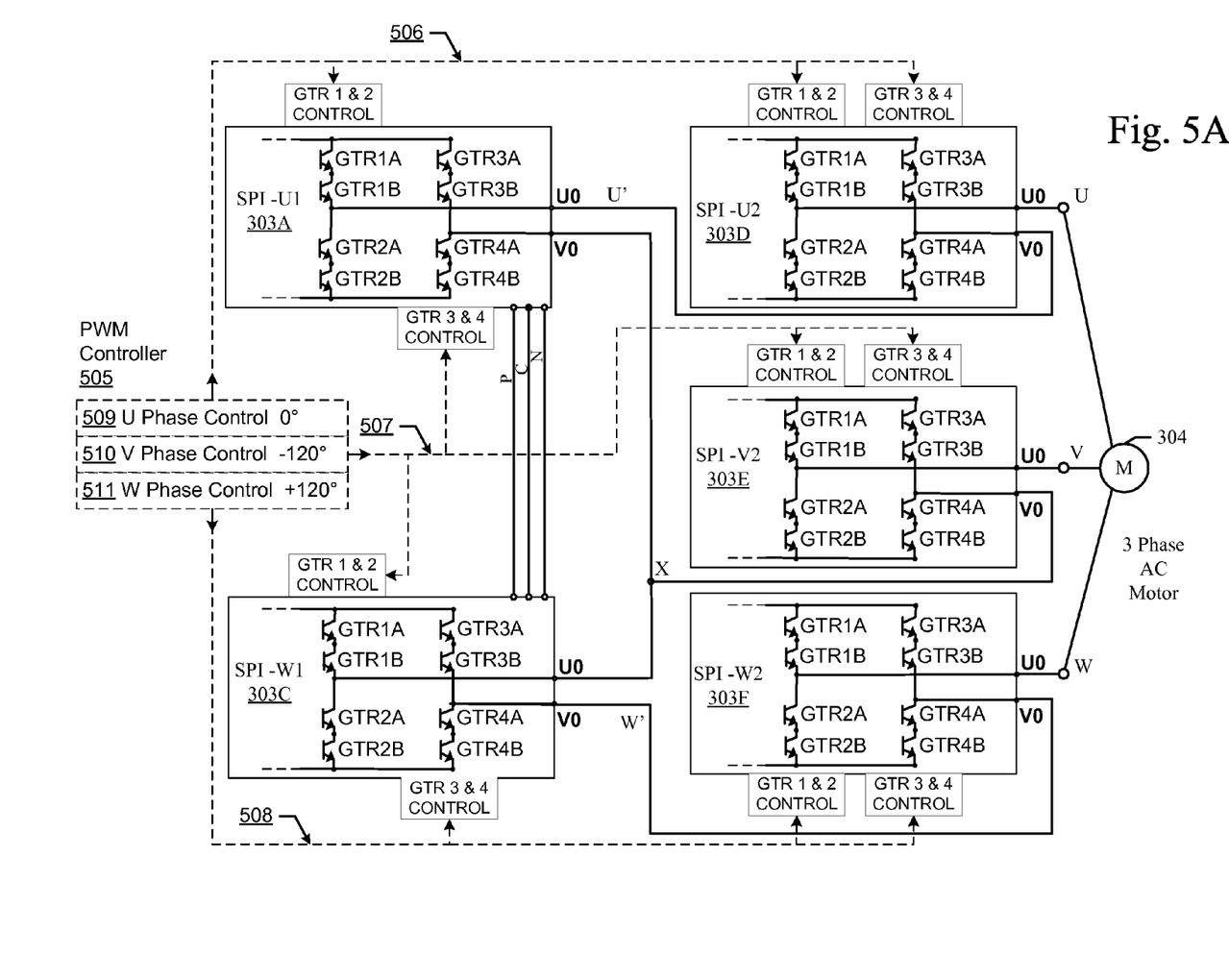
FIG. 5A illustrates a circuit diagram of one embodiment of an inverter system utilizing five single-phase neutral-point-clamp inverter cells with pulse-width-modulation control of the outputs of the cells.
Figure 5B:
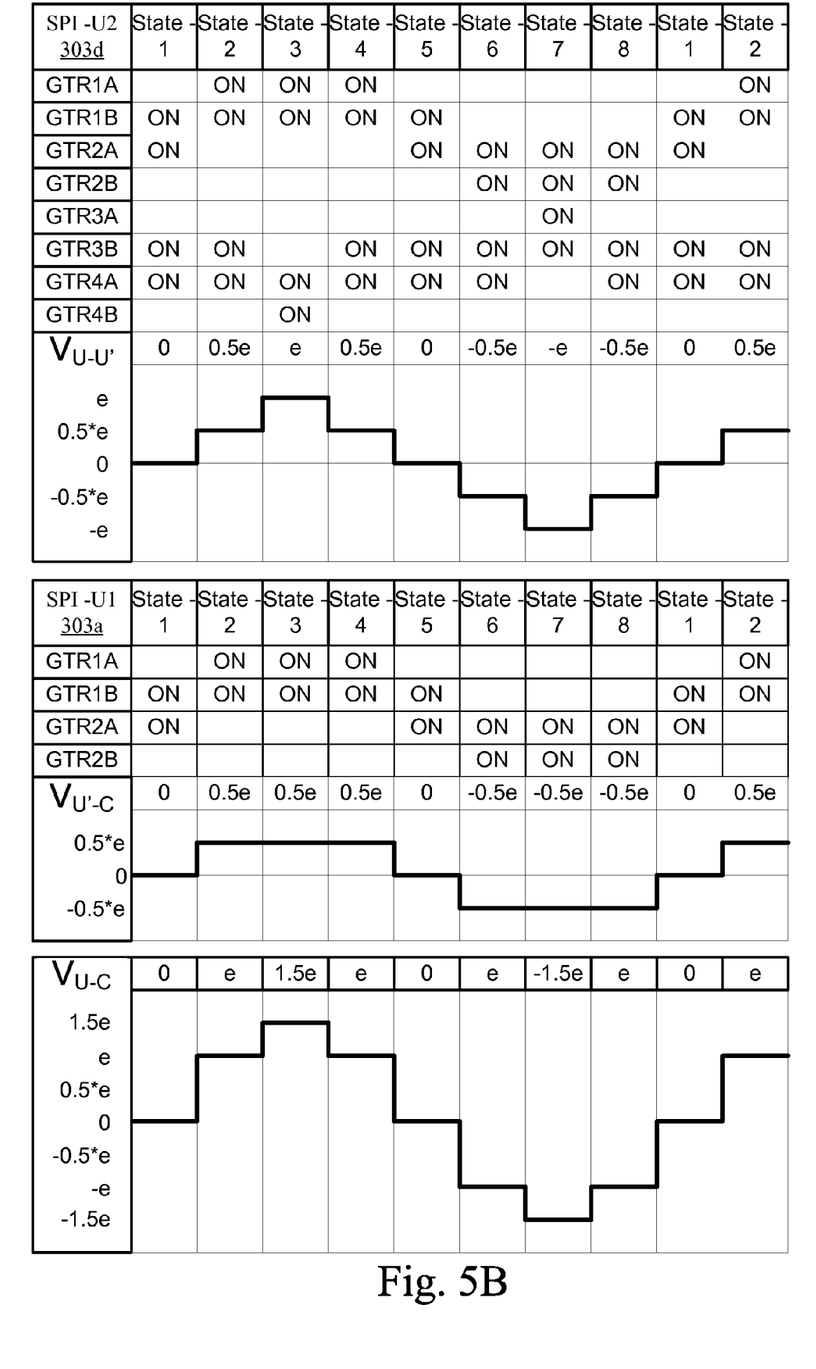
FIGS. 5B, 5C, and 5D illustrate the relationship between the pulse-width-modulation output control signals and the phase outputs of the inverter system of FIG. 5A.
Figure 5C:
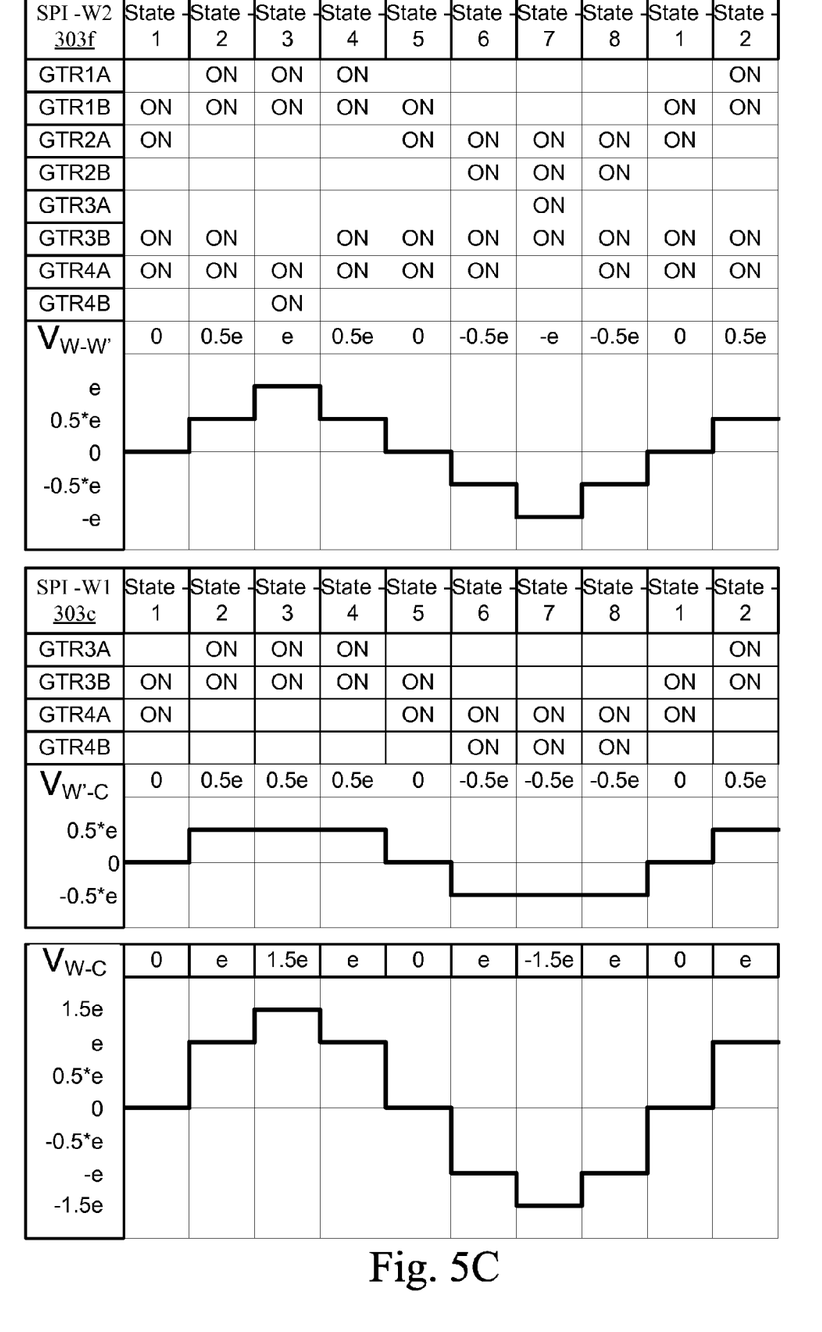

FIG. 5A illustrates in one aspect of the inverter system, pulse-width-modulation control of the GTR transistor gates in each of the inverter cells 303a, 303c, 303d, 303e, and 303f of the inverter system in FIG. 3A. The PWM controller 505 may be implemented as software using computer-executable instructions (e.g., software stored on a computer-readable medium, such as a hard drive, RAM, etc.) executed by a processor, hardware logic, or any desired combination of the two. In one example, the PWM controller 505 is comprised of U, V, and W phase control circuits 509, 510, and 511, respectively, which may be of similar design, and which may be constructed from any combination of digital and analog circuitry as is commonly known for producing control signals for driving GTR transistor gates as illustrated in FIGS. 5B and 5C. The phase control circuits 509, 510, and 511 drive three sets of phase control signals respectively, including U phase PWM control signals 506, V phase PWM control signals 507, and W phase PWM control signals 508, to control the operation of the various components of the system. Each set of U, V, and W phase PWM control signals may be 120° phase shifted from each other.

The U phase PWM control signals 506 may switch ON/OFF transistors GTR1A, GTR1B, GTR2A, GTR2B, GTR3A, GTR3B, GTR4A and GTR4B of inverter cell 303$d$ and transistors GTR1A, GTR1B, GTR2A and GTR2B of 303$a$.

The V phase PWM control signals 507 switch ON/OFF transistors GTR1A, GTR1B, GTR2A, GTR2B, GTR3A, GTR3B, GTR4A and GTR4B of inverter cell 303$e$, transistors GTR3A, GTR3B, GTR4A and GTR4B of 303$a$, and GTR1A, GTR1B, GTR2A and GTR2B of 303$c$.

The W phase PWM control signals switch ON/OFF transistors GTR1A, GTR1B, GTR2A, GTR2B, GTR3A, GTR3B, GTR4A and GTR4B of inverter cell 303$f$ and transistors GTR3A, GTR3B, GTR4A and GTR4B of inverter cell 303$c$.

Figure 5D:
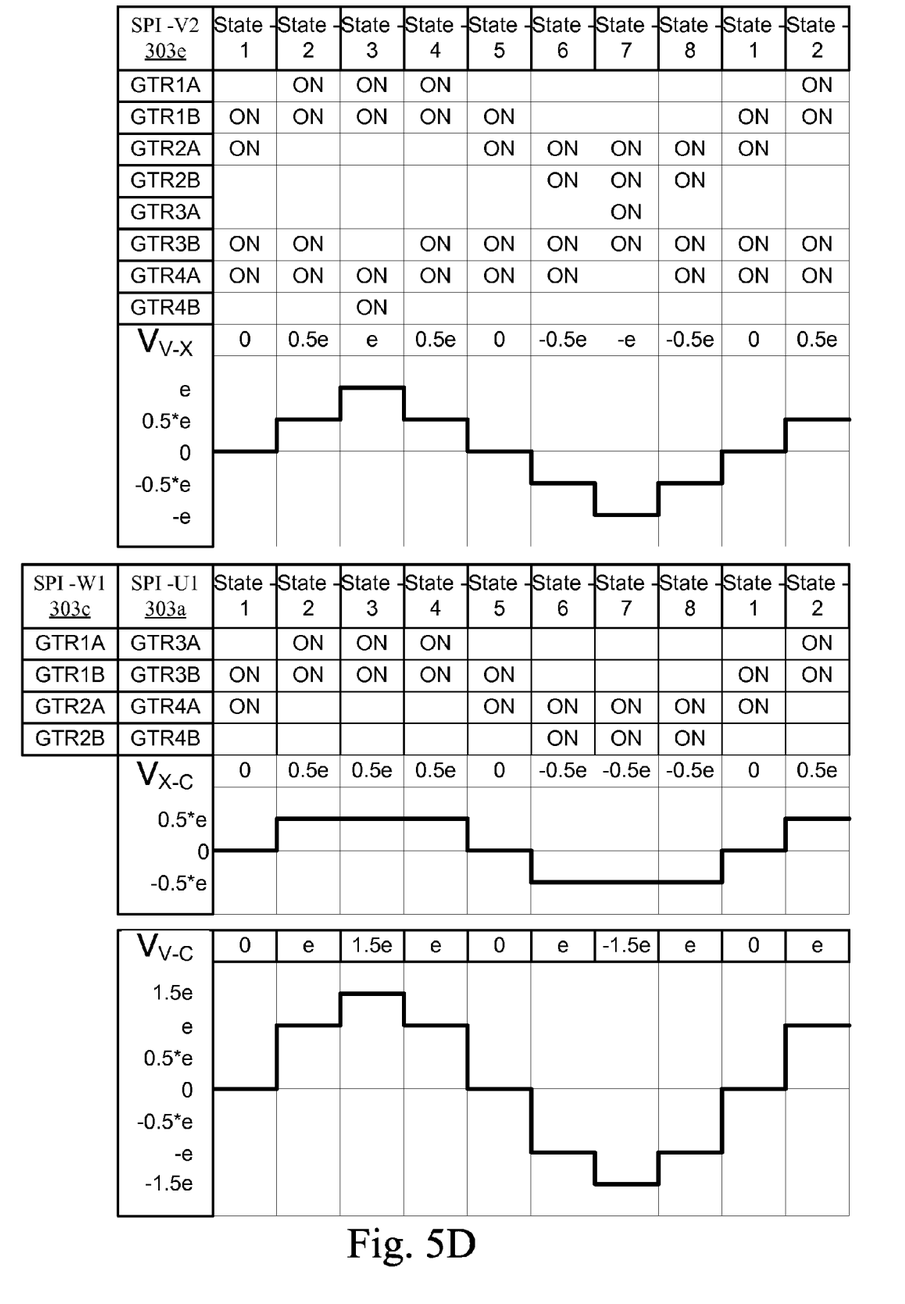

FIGS. 5B, 5C, and 5D illustrate example relationships between the pulse-width-modulation output control signals and the phase outputs of the inverter system of FIG. 5A. FIG. 5B illustrates various states of the U phase PWM control signals 506 to the GTR gates of inverter cells 303$a$ and 303$d$. The controlled GTR transistors of 303$a$ and 303$d$ are listed down the left column of the tables and the ON or OFF status of each of these switches are listed across in rows. Each adjacent column of the table represents one of eight states that the U-phase PWM control signals 506 transition through in time (from left to right). Below the tables are the resultant U-to-U' and U'-to-C voltage waveforms produced by the state transitions. At the bottom of the figure is the total U-to-C voltage waveform produced by the sum of the U-to-U' and U'-to-C voltage waveforms. In this example, the switches are controlled to produce a 6-level step waveform designed to replicate a sine wave. Also in this example, transistors GTR1A, GTR1B, GTR2A, GTR2B of inverter cell 303$a$ are controlled to match the control of transistors GTR1A, GTR1B, GTR2A and GTR2B of inverter cell 303$d$.

FIG. 5C illustrates various states of the W phase PWM control signals 508 to the GTR gates of inverter cells 303$c$ and 303$f$. The states and waveforms are identical to that shown for the U-phase PWM control signals except the states of GTR3A, GTR3B, GTR4A, GTR4B of inverter cell 303$c$ are controlled to match the states of transistors GTR1A, GTR1B, GTR2A and GTR2B of inverter cell 303$f$. The overall states of FIG. 5C are also shifted 120°, or approximately 2.67 states in time, from the overall states of FIG. 5B.

FIG. 5D illustrates various states of the V phase PWM control signals 507 to the GTR gates of inverter cells 303$a$, 303$c$ and 303$e$. The states and waveforms are identical to that shown for the U-phase and V-phase PWM control signals except the states GTR3A, GTR3B, GTR4A, GTR4B of inverter cell 303$a$ and the states of GTR1A, GTR1B, GTR2A and GTR2B of inverter cell 303$c$ are controlled in parallel to match the states of transistors GTR1A, GTR1B, GTR2A and GTR2B of inverter cell 303$e$. The overall states of FIG. 5C are also shifted 120°, or approximately 2.67 states in time, from the overall states of FIGS. 5B and 5C.

The illustrative features described above are examples. The scope of the present patent should not be limited to require all described features, but should rather only be limited by the claims that follow.

We claim:

1. A voltage inverter system, comprising:
five inverter cells, each including a U-output terminal and a V-output terminal, wherein:
the U-output terminal of a first one of the inverter cells is electrically coupled to the V-output terminal of a second one of the inverter cells;
the V-output terminal of the first inverter cell is electrically coupled to the U-output terminal of a third one of the inverter cells via a connection that does not pass through the U-output terminal of the first inverter cell or the V-output terminal of the third one of the inverter cells, and to the V-output terminal of a fourth one of the inverter cells;
the V-output terminal of the third inverter cell is electrically coupled to the V-output terminal of a fifth one of the inverter cells via a connection that does not pass through the U-output terminal of the third inverter cell or the U-output terminal of the fifth one of the invert cells; and
the U-output terminals of the second, fourth and fifth inverter cells are three-phase output terminals of the system.

2. The system of claim 1, wherein the first inverter cell includes a DC bus terminal, the third inverter cell includes a corresponding DC bus terminal, and the DC bus terminals are electrically coupled to one another.

3. The system of claim 2, wherein the electrically coupled DC bus terminals of the first and third inverter cells are neutral point terminals.

4. The system of claim 2, wherein the electrically coupled DC bus terminals of the first and third inverter cells are both positive terminals, or both negative terminals.

5. The system of claim 1, wherein the first inverter cell includes a DC bus having positive, neutral and negative terminals, the third inverter cell includes a DC bus having positive, neutral and negative terminals, and the positive, neutral and negative DC bus terminals of the first inverter cell are electrically coupled to the positive, neutral and negative DC bus terminals of the third inverter cell, respectively.

6. The system of claim 1, wherein the inverter cells each further include two three-phase inputs electrically coupled to a transformer.

7. The system of claim 1, wherein the inverter cells each further include four three-phase inputs, two of which are electrically coupled to a first input transformer, and the other two of which are electrically coupled to a second input transformer, wherein output windings of the second transformer are phase offset from output windings of the first transformer.

8. The system of claim 1, wherein the inverter cells include external rectifiers.

9. The system of claim 1, wherein the inverter cells are electrically identical to one another.

10. The system of claim 1, wherein the inverter cells are single-phase neutral-point-clamp type inverter cells.

11. The system of claim 1, further comprising:
a pulse-width modulation controller electrically coupled to switches of the inverter cells;
a motor electrically coupled to the three-phase output terminals of the system.

12. A power supply method, comprising:
supplying pulse-width modulation control signals to switches of five inverter cells in a three-phase inverter system, wherein each of the inverter cells has a single phase output voltage of e, and the control signals are supplied to provide a phase-to-phase voltage difference of $\sqrt{3}(e+e/2)$ between any two of three output phases of the system, and wherein a U-output terminal of a first of the inverter cells is coupled with V-output terminals of two of the other inverter cells; and supplying three-phase output from the inverter system as a result of the control signals.

13. The method of claim 12, wherein the supplying pulse-width modulation control signals further comprises supplying three identical sets of control signals, the sets being offset by 120 degrees from one another.

14. A method, comprising:

electrically coupling a U-output terminal of a first inverter cell to a V-output terminal of a second inverter cell;

electrically coupling a V-output terminal of the first inverter cell to a U-output terminal of a third inverter cell using a connection that does not pass through a U-output terminal of the first inverter cell or a V-output terminal of the third inverter cell, and to a V-output terminal of a fourth inverter cell;

electrically coupling a V-output terminal of the third inverter cell to a V-output terminal of a fifth inverter cell; and using a U-output terminal of the second inverter cell, a U-output terminal of the fourth inverter cell and a U-output terminal of the fifth inverter cell to provide a three-phase output.

15. The method of claim 14, further comprising electrically coupling a DC bus terminal of the first inverter cell with a corresponding DC bus terminal of the third inverter cell.

16. The method of claim 15, wherein the electrically coupled DC bus terminals of the first and third inverter cells are neutral point terminals.

17. The method of claim 15, wherein the electrically coupled DC bus terminals of the first and third inverter cells are both positive terminals, or both negative terminals.

18. The method of claim 14, further comprising electrically coupling the inverter cells to input from a three-phase transformer.

19. The method of claim 14, further comprising electrically coupling the inverter cells to three-phase inputs from two transformers having phase offset outputs.

20. The method of claim 14, further comprising supplying three-phase output by supplying pulse-width modulation control signals to switches of the five inverter cells, wherein each of the inverter cells has a phase-to-phase output voltage of e, and the control signals are supplied to provide a phase-to-phase voltage difference of $\sqrt{3}(e + e/2)$ between any two of the three phases of output.

21. The method of claim 14, further comprising replacing a failed one of the inverter cells with a replacement inverter cell.

* * * * *